United States Patent Office 3,218,266
Patented Nov. 16, 1965

3,218,266
OLEFIN POLYMERIZATION CATALYSTS
David Blodgett Ludlum, Rockville Centre, N.Y., assignor to E. I. du Pont de Nemours and Company, Wilmington, Del., a corporation of Delaware
Continuation of application Ser. No. 551,389, Dec. 6, 1955. This application Aug. 17, 1964, Ser. No. 390,007
2 Claims. (Cl. 252—429)

This application is a continuation of U.S. patent application Serial No. 551,389, filed December 6, 1955, which application is in turn a continuation-in-part of U.S. patent application Serial No. 520,112, filed July 5, 1955, and now abandoned.

This invention relates to polymerization of alpha olefins, especially ethylene, higher alkenes, phenyl alkenes, and the like.

It was known heretofore that catalyst systems obtained by admixing a vanadium or titanium halide with a compound having aluminum directly attached to at least one hydrocarbon group, are effective in the polymerization of ethylene to form linear high density polymer at relatively low pressures.

It has now been discovered, in accordance with the present invention, that catalysts formed by admixing a vanadium compound with a titanium halide, and with a compound having a metal (such as aluminum) attached to —H or at least one hydrocarbon group, are more active as polymerization catalysts, than the aforesaid previously known catalyst systems, the increased activity being the result of a synergistic influence exerted by the combination of the vanadium component with the titanium component.

It is noteworthy that vanadium halide-aluminum trialkyl catalysts are generally much more active than titanium halide-aluminum trialkyl catalysts. In fact, the catalyst complex from one mol of titanium tetrachloride has an initial activity equal to that from one twenty-fifth of a mol of vanadium tetrachloride. Nevertheless, the extraordinary activity of the catalysts of the present invention does not merely reflect the additive effect of highly active vanadium. Instead, the activity is the result of a synergism between the vanadium and titanium components, the theoretical explanation for which is still in doubt.

The presence of a vandium component in combination with the titanium tetrachloride-aluminum trialkyl catalyst systems employed in ethylene polymerization is reflected not only in greatly enhanced initial activity, but also in an overall increase in yield of polymer per unit weight of catalyst, as exemplified hereinafter. The combined components produce high molecular weight polymer initially, and this is followed by the formation of polymer of a lower molecular weight range as the polymerization progresses. An important advantage of the invention resides in the production of increased yields at desired levels of molecular weight.

The mixing of the catalyst components may be carried out at any temperature, preferably within the range of 0° to 300° C. The polymerization can be conducted at any temperature within this range or even at a much lower temperature. The catalysts are active at temperatures as low at —80° C. Pressure is preferably within the range of 1 to 200 atmospheres, but higher or lower pressures can quite readily be employed.

Any quantity of catalyst and liquid medium may be employed, the rate of formation of product being of course dependent on the quantity of catalyst. The number of mls of reducing component should preferably be sufficient to reduce the valence of the Ti and/or V, at least in part to two.

The catalysts of this invention are preferably prepared in an inert hydrocarbon medium, such as decahydronaphthalene, cyclohexane, benzene, etc. The titanium is preferably added in the form of $TiCl_4$, or other form which is soluble in inert hydrocarbon solvents or is a precursor of a form which is soluble in inert hydrocarbon solvents. Other titanium halides may be employed, including those containing alkoxy groups, such as $Ti(O\ alkyl)_2Cl_2$. The vanadium may be introduced in the form of $VCl_4$, or other halide, such as $VOCl_3$ or in any form which is soluble in the hydrocarbon medium or is a precursor of a hydrocarbon soluble form. Moreover, the vanadium may be introduced in any form which can produce a vanadium halide by metathesis, such as ammonium vanadate. A suitable salt such as ammonium vanadate can be added to $TiCl_4$ prior to dissolving the latter in the hydrocarbon medium, to produce an effective catalyst mixture. In certain embodiments, the quantity of vanadium is extremely minute.

The order of addition of the reducing component to the reducible components is critical, if optimum results are to be achieved. The reducing agent can be added to the mixed halides, but the mixed halides should not be added to the reducing agent, to obtain optimum results. However, the synergistic effect is also observed, when the opposite order of addition is used. The vanadium component can be added before or after the addition of the titanium component, but it is preferred to reduce both components simultaneously, as this gives the best result. Separate streams of halide and reducing agent can be united to produce an effective combined catalyst. It is desirable, however, to avoid too large an excess of reducing agent at the time when the initial mixing takes place, and this can be achieved by joining the streams, or by introducing the solution of reducing agent into the solution of halides rather than by adding the ingredients in the reverse order.

When the ratio of vanadium to titanium is high, the catalysts are more active than the catalysts containing no titanium. When the ratio of vanadium to titanium is very low, the catalysts are more active than those containing no vanadium.

In Examples I–V described below, the solution containing titanium tetrachloride is saturated with ethylene prior to reduction with the aluminum alkyl. This introduction of ethylene prior to introduction of the reducing agent is not particularly critical, and in certain embodiments, it is desirable to carry out the reduction prior to introducing the ethylene.

The invention is further illustrated by means of the following examples:

EXAMPLE I

A solution of aluminum trihexyl in decahydronaphthalene was prepared, the aluminum trihexyl content being 180 micromols per 4.5 ml. A solution of vanadium tetrachloride in decahydronaphthalene was also prepared, the content of vanadium tetrachloride being 3 micromols per 1.0 ml. A third solution, consisting of 45 micromols titanium tetrachloride per 1.0 ml. was also prepared. To 100 ml. decahydronaphthalene was added 1.0 ml. of the titanium tetrachloride solution and the resulting mixture was saturated with ethylene at 100° C., at atmospheric pressure. Using a closed system, 4.5 ml. of the aluminum trialkyl solution was introduced into the liquid reaction mixture, and the mixture was agitated, ethylene absorption at atmospheric pressure being determined quantitatively. The initial rate of ethylene absorption (which corresponds with the rate of polymerization) was 25 ml. per minute. After 140 minutes, the rate had dropped to 1 ml. per minute, and the total volume of ethylene absorbed was 540 ml. In a parallel experiment 1.0 ml. of the vanadium tetrachloride solution (3 micromols) was employed in place of the titanium tetrachloride. This resulted in an initial rate of 50 ml. per minute, which, however, dropped off to less than 0.3 ml. per minute when the reaction time had reached 140 minutes. At that time the total quantity of ethylene absorbed was 230 ml. A mixture made by adding 3 micromols of vanadium tetrachloride (1.0 ml. of the vanadium solution prepared as above) and 45 micromols titanium tetrachloride (1.0 ml. of the titanium solution), all other conditions including the quantity of aluminum trihexyl being unchanged, gave an initial rate of 50 ml. per minute; the rate was somewhat greater than 5 ml. per minute after 140 minutes, and the total quantity of ethylene absorbed at that time was 1520 ml. The quantity of polymer produced in the latter experiment was large enough to form a gel, and this contributed to a decrease in rate of polymer after such gel was formed.

EXAMPLE II

A solution containing 21 micromols vanadium tetrachloride and 9 micromols titanium tetrachloride in about 100 ml. decahydronaphthalene was saturated with ethylene. The reaction system was connected with a source of ethylene, and with facilities for maintaining the pressure constant at one atmosphere. Also, equipment was provided for measuring rate of absorption of ethylene. The temperature of the reaction mixture was maintained at 100° C. Upon the introduction of 80 micromols aluminum trihexyl (in decahydronaphthalene at same concentration as Example I), measurement of rate of ethylene absorption was commenced. The initial rate was 180 ml. per minute. After 75 minutes, the rate was 5 ml. per minute, and a total of 1620 ml. had been absorbed, a corresponding quantity of polyethylene having been formed.

EXAMPLE III

A solution containing 6 micromols $VOCl_3$ and 45 micromols titanium tetrachloride in about 100 ml. decahydronaphthalene was saturated with ethylene. The reaction system was maintained at 100° C. and was kept closed, there being provision for measurement of rate of absorption of ethylene at atmospheric pressure, as in Examples I and II. Upon the introduction of 180 micromols of aluminum trihexyl (in decahydronaphthalene at same concentration as Example I), measurement of rate of ethylene absorption was commenced. The initial rate was 100 ml. per minute. After 120 minutes, the rate was 5 ml. per minute, and the total volume of ethylene polymerized was 1800 ml. In a parallel experiment using the same source of titanium tetrachloride (differing, however, from that of Example I), but with no $VOCl_3$ added, the initial rate was 54 ml. per minute. The volume polymerized after 120 minutes was 1150 ml., and the absorption rate was 1 ml. per minute. In another parallel experiment, using the same quantity of $VOCl_3$, but no titanium tetrachloride, the initial rate was 21 ml. per minute. After 120 minutes, the total volume of ethylene absorbed was 275 ml., and at that time the ethylene absorption rate had decreased to zero.

EXAMPLE IV

Using the technique described in the preceding examples ethylene was polymerized at 100° C., atmospheric pressure, the catalyst components being 45 micromols titanium tetrachloride, no added vanadium compound and 97 micromols of $LiAl(heptyl)_4$. The initial rate of ethylene absorption (polymerization) was 19 ml. per minute. After 120 minutes, ethylene absorption totaled 215 ml., and at that time the rate of absorption was less than 0.5 ml. per minute. The experiment was repeated, using 3 micromols of vanadium tetrachloride in place of 45 micromols of titanium tetrachloride. The rate of absorption was less than 0.5 ml. per minute. The experiment was repeated using, in addition to 3 micromols of vanadium tetrachloride, 45 micromols of titanium tetrachloride, the same quantity of $LiAl(heptyl)_4$ being used in all of these runs. The initial rate of ethylene absorption was 55 ml. per minute, and after 120 minutes, the total volume absorbed and converted to polymer was 685 ml. The rate of absorption at that time was 2 ml. per minute.

EXAMPLE V

Using the technique described in the preceding example, ethylene was polymerized at 100° C., atmospheric pressure, the catalyst components being 45 micromols titanium tetrachloride, 9 micromols $VO(O\text{-isopropyl})_3$, 180 micromols aluminum trihexyl in ca. 100 ml. decahydronaphthalene. The initiate rate of polymerization was 40 ml. per minute, and after 120 minutes, the rate was 5 ml. per minute, the total volume of ethylene polymerized at that time being 1830 ml. In a parallel run, in which the $TiCl_4$ was omitted, all other ingredients being the same, the initial rate was only 4 ml. per minute, and after 120 minutes the rate had dropped to zero. The total volume of ethylene absorbed was only 20 ml.

EXAMPLE VI

Into a 330 ml. stainless steel shaker tube flushed with nitrogen was added a solution consisting of 0.20 mol $LiAlH_4$, 0.01 mol titanium tetrachloride, 0.01 mol vanadium tetrachloride, 0.24 mol cyclohexene and 100 ml. cyclohexane. After sealing and cooling the tube, it was alternately evacuated and flushed with nitrogen to insure a 100% nitrogen atmosphere. The tube was heated at 100° C. for 10 minutes under autogenous pressure. Thereupon, 20 grams of ethylene were added and the temperature was maintained at 100° for an additional 45 minutes. The tube was cooled, discharged, and the contents were worked up by stirring in a Waring Blendor with acetone until the polymer was white. The resulting mixture was filtered and the polymer was dried. The weight of dried product was 13.5 grams, the melt index being 5.4 at 190° C.

EXAMPLE VII

A catalyst mixture was prepared by adding 0.05 mol equivalents tin tetrabutyl to 0.01 mol equivalents titanium tetrachloride and 0.01 mol equivalents of vanadium tetrachloride in dry toluene solution. Ethylene was polymerized in the presence of this catalyst at 100 pounds per square inch of pressure. During the course of the reaction, temperature was permitted to rise from 100° C. to 200° C., which caused the pressure to rise to a maximum of 1200 pounds per square inch. The melt index was too low for measurement under standard conditions of testing, but was 0.2 at 190° when measured under an extra load (5 kg.). This indicates very high molecular weight. Similar runs in which the vanadium component and the titanium component were omitted, respectively, gave polymers which had measurable, though low, melt indexes without extra load.

EXAMPLE VIII

Into a continuous reactor having a capacity of one gallon was continuously fed 45 pounds of cyclohexane per hour, containing a catalyst formed from 0.222 millimols of $TiCl_4+VOCl_3$(Ti/V mol ratio=4/1) and aluminum tri-isobutyl (Al/(Ti+V) mol ratio=2/1). With the cyclohexane was also introduced 8.3 pounds per hour of ethylene. Pressure was maintained at 2500 pounds per square inch, by means of a suitable outlet valve through which the product was withdrawn. The solvent was flashed from the resulting mixture by releasing pressure, leaving polyethylene as fluff. When the temperature in the reaction zone was maintained at 255° C. the polyethylene thus formed had a melt index of 2±0.5; when the temperature was raised to 265°, the polyethylene had a melt index of 3.5. The rate of production was 339,000 pounds per pound mol of Ti+V. The ash content of the polymer was extremely low (about 115 p.p.m.) without any alcoholysis or other further treatment.

EXAMPLE IX

A catalyst mixture was obtained by reaction between 15 micromols $TiCl_4$, 5.2 micromols of $VCl_4$ and 120 micromols of $LiAl(isobutyl)_3Cl$ in 100 ml. decahydronaphthalene at 100° C.(ethylene blanket). Ethylene was injected into the resulting mixture, and it was found that the rate of polymerization was more rapid than the additive rates in similar systems obtained from the same quantities of $TiCl_4$ and $VCl_4$ respectively, upon reaction with $$LiAl(C_4H_9)_3Cl$$

(Note: The $LiAl(alkyl)_3$ Cl employed in these experiments was obtained by reaction between equivalent quantities lithium isobutyl and aluminum trichloride in decahydronaphthalene. This reaction produced a white powdery precipitate of $LiAl(isobutyl)_3Cl$, which was separated and redispersed in decahydronaphthalene.)

EXAMPLE X

Thirteen experiments were made under conditions set forth in the following tables using an apparatus such as that illustrated in the drawing, comprising a pressure resistant vessel 1, an inlet tube 2 at the bottom for introduction of a cyclohexane-ethylene mixture, a dip tube 3 extending from the top of the vessel 1 to the lower portion thereof, an outlet tube 4 near the top of the vessel 1 equipped with a suitable outlet valve 5; another vessel 6 containing a solution of $TiCl_4$ in cyclohexane (concentration being ten times the number of millimols per liter set forth in the tables which follow); another vessel 7 containing a solution of vanadium halide ($VCl_4$ or $VOCl_3$, as stated in the tables, the concentration being ten times the number of millimols per liter set forth in the tables) in cyclohexane; still another vessel 8 containing aluminum tri-isobutyl in cyclohexane (concentration ten times the number of millimols per liter set forth in the tables); catalyst feed tubes 9 for combining a stream drawn from the vessel containing the Ti component with a stream from the vessel containing V component, a tube 10 for introducing into this combined stream a stream, contained in a tube 11 from the vessel 8, and containing the aluminum trialkyl component, the resulting reaction product being fed into the reaction vessel through the dip tube 3. In this apparatus, the reaction between the aluminum alkyl and the reducible catalyst components was in each instance completed in the feed tube prior to entry of the combined mixture into the polymerization zone through the dip tube. The rates of feed in the respective feed lines were adjusted to produce the quantities of the respective components set forth in the tables, and the temperaure, pressure and rate of throughput were also adjusted to the levels listed in the tables. The polymerization was performed continuously. The outlet stream was combined with a stream 12 of methanol (1 part by weight methanol per 60 parts of outlet stream). This was not sufficient to precipitate polymer, temperature being still at the reaction temperature level. Pressure was let down by means of the outlet valve 5 to 1 atmosphere, and the solvent was thus flashed off and recovered 13, the product being collected as a solid (fluff) in a suitable receiver 14. The product was substantially dry, but contained all of the "ash" formed from the catalyst. To eliminate "ash" the product fluff was slurried 15 with methanol in the absence of moisture at room temperature for about one-half hour. The alcohol reacted with the "ash" forming alcohol-soluble material which was washed away with more methanol. The product was dried 16 in a current of warm air, which resulted in clear white low "ash" product ("ash" content reduced to about one-third of its original "ash" content, i.e. to a few hundred p.p.m. or less). The methanol can be recovered by redistillation if desired 17. (Note: If it is desired to completely eliminate "ash," this can be done by increasing the quantity of methanol introduced into the hot effluent under pressure to such an extent that a separate phase of molten polyethylene is precipitated, and withdrawing this molten phase of "ash"-free product. The latter operation can be performed in any suitable vessel adapted for separation of liquid phases at superatmospheric pressure).

*Table I*

Synergistic Effect of Vanadium Compounds on $TiCl_4$-$Al(i$-$Bu)_3$ System

| Run No | 1 | 2 | 3 | 4 | 5 | 6 | 7 | 8 |
|---|---|---|---|---|---|---|---|---|
| $TiCl_4$, mM./l., in polymerization zone | 0.57 | 3.38 | 5.78 | | 0.225 | 0.265 | 0.13 | 0.375 |
| $VOCl_3$, mM./l., in polymerization zone | | | | | 0.025 | 0.085 | 0.13 | |
| $VCl_4$, mM./l., in polymerization zone | | | | 0.265 | | | | 0.125 |
| Ratio, Ti/V | | | | | 9 | 3 | 1 | 3 |
| $Al(i$-$Bu)_3$, mM./l. in polymerization zone | 0.70 | 3.22 | 3.37 | 0.43 | 0.35 | 0.47 | 0.36 | 0.685 |
| Ratio, Al/(Ti and/or V) | 1.21 | 0.93 | 0.58 | 1.62 | 1.40 | .136 | 1.40 | 1.37 |
| Temperature, °C | 211 | 240 | 210 | 242 | 240 | 245 | 248 | 250 |
| Pressure, atm | 54 | 54 | 54 | 75 | 75 | 75 | 75 | 75 |
| Wt. ratio cyclohexane/ethylene in feed | 7.5 | 13.4 | 11.2 | 14.4 | 9.1 | 5.7 | 10.6 | 7.6 |
| Conversion of ethylene, percent | 53 | 18 | 18 | 55 | 50 | 74 | 83 | 74 |
| Lbs. feed/hr./l. reactor volume | 0.71 | 0.13 | 0.15 | 0.39 | 0.48 | 1.3 | 0.91 | 0.91 |
| Yield, lbs. ×$10^{-3}$ polymer/lb. mole (Ti and/or V) | 95 | 19.4 | 12.2 | 116 | 148 | 294 | 250 | 141 |
| Melt index | 0.17 | 3.1 | 19.5 | 0.71 | 1.7 | 3.8 | 10.0 | 2.7 |

*Table II*

Synergistic Effect of Vanadium Compounds on $Ti(O$-$i$-$Pr)_2Cl_2$-$Al(i$-$Bu)_3$ System

| Run No | 9 | 10 | 11 | 12 | 13 |
|---|---|---|---|---|---|
| $Ti(O$-$i$-$Pr)_2Cl_2$, mM./l., in polymerization zone | 0.59 | 0.51 | 1.70 | 0.45 | 0.375 |
| $VCl_4$, mM./l., in polymerization zone | | | | 0.05 | 0.125 |
| Ratio, Ti/V | | | | 9 | 3 |
| $Al(i$-$Bu)_3$, mM./l., in ploymerization zone | 0.70 | 0.68 | 3.27 | 0.68 | 0.76 |
| Ratio, Al/(Ti and/or V) | 1.22 | 1.30 | 2.02 | 1.47 | 1.52 |
| Temperature, °C | 240 | 242 | 220 | 244 | 241 |
| Pressure, atm | 54 | 75 | 54 | 75 | 75 |
| Wt. ratio cyclohexane/ethylene in feed | 16.1 | 16.1 | 11.2 | 7.3 | 8.9 |
| Conversion of ethylene, percent | 26.7 | 28.5 | 31 | 53 | 64 |
| Lbs. feed/hr./l. reactor volume | 0.17 | 0.17 | 0.17 | 0.67 | 0.76 |
| Yield, lbs.×$10^{-3}$ polymer/lb. mole (Ti and/or V) | 24 | 27 | 12.8 | 107 | 118 |
| Melt index | 2.0 | 0.42 | 5.3 | 1.1 | 1.3 |

As is apparent from Example V, the vanadium comonent need not contain halogen as introduced into the reaction vessel. It is advantageous that the vanadium component be soluble to some extent in the reaction mixture, however. In fact, both the vanadium and titanium should be at least partially dissolved, in the sense that certain compounds having inorganic components are regarded as being capable of solution in organic media. This does not at all imply that the polymerization is necessarily one resulting from purely homogeneous catalysis. The active centers may indeed be on colloidal surfaces, so that even where the catalyst components are soluble, the active catalyst itself may be colloidal, and the distribution of active catalyst within the mixture, as well as the overall activity of the mixture, can be affected by the high speed ultracentrifuge. Because of such observations as these, it is to be understood that the invention is not limited by any theory as to the nature or explanation of the pocatalysis, from the standpoint of whether or not the polymerization is initiated by active centers on solid colloidal surfaces.

It is to be understood also that the foregoing examples are illustrative only and that numerous embodiments of the invention will occur to those who are skilled in the art. For example, other metal alkyls or other compounds having metal attached to an organic group through a metal-carbon bond, besides those illustrated in the examples may be employed. The choice of metal alkyl for best results depends upon the conditions. At relatively high temperatures, metal alkyls which are comparatively weak reducing agents, i.e., aluminum trialkyls, are excellent, while at lower temperatures somewhat stronger reducing agents, such as lithium alkyls, can be used effectively. These stronger reducing agents should preferably not be combined with reducible components which are reduced with great ease at elevated temperatures, for optimum results. At very low temperatures, the latter combinations are effective.

While the synergistic action is observed over a wide range of temperatures, as hereinabove set forth, it is especially pronounced at temperatures high enough to produce a solution of the polymer, e.g. 100° C., or higher.

It should be noted that the synergistic effect is reflected in the yield of polyethylene per unit weight of catalyst, and in the surprisingly high yields achieved at levels of melt index which prior to the present invention were regarded as associated with much lower yields. For example, at a melt index of 3.1 the $TiCl_4$-$Al(isobutyl)_3$ catalyst system produces about 19,400 pounds of polyethylene per mol pound of catalyst, while a 3/1 mixture of $TiCl_4$ and $VCl_4$ with $Al(isobutyl)_3$ yields 141,000 pounds of polymer per pound mol of (Ti+V), at a melt index of 2.7. In contrast with this, at a melt index of 0.17, the $TiCl_4$-$Al(isobutyl)_3$ system is capable of giving yields of about 100,000 pounds of polymer per pound mol of Ti, or in particular instances even higher yields. In other words, the improvement is more pronounced at moderate molecular weight ranges (melt index, from 1 to 5) than at extremely high molecular weight ranges (melt index below 1). The present invention is thus of great value in the manufacture of linear polyethylene which is readily extrudable, i.e. which is not of excessively low melt index, at high yields, exceeding 140,000 pounds per pound mol of catalyst. This is a result which was not attainable heretofore. Another important useful advantage of the present invention, as applied to the production of polyethylene in solution, is that it permits the manufacture of "solution polymer" which is free of "grease." Still another important useful advantage which results from the greater yields is the lowering of catalyst cost, and the cost of producing polymer which is virtually free of impurity derived from the catalyst. The latter advantage is especially significant in connection with the use of catalyst components which are effective in production of highly desirable grease-free polymer, but which are relatively expensive (e.g. $LiAl\ alkyl_4$).

The catalysts obtained by the method herein disclosed are effective for polymerization of alpha olefinic compounds, generally, such as alpha olefinic hydrocarbons, vinyl compounds, vinylidene compounds, and the like.

While, in the foregoing description, the transition elements present in the catalysts are limited to vanadium and titanium, it is to be understood that other transition elements may, in specific embodiments, also be present in the form of their compounds. These elements, arranged approximately in the order of the activity of their compounds in catalysts of the type herein disclosed are: V, Ti, Nb, Zr, Mo, Cr, Ta, W, Th, Ce, Mn, and Hf. Any of the possible combinations of these compounds may be employed in catalysts based on the synergism which has been discovered in accordance with this invention.

I claim:

1. A polymerization catalyst prepared by introducing an aluminum trialkyl into a solution of $TiCl_4$ and a vanadium chloride selected from the group consisting of $VCl_4$ and $VOCl_3$ in an inert liquid hydrocarbon medium.

2. A polymerization catalyst prepared by combining streams containing (1) an aluminum trialkyl and (2) a solution of $TiCl_4$ and a vanadium chloride selected from the group consisting of $VCl_4$ and $VOCl_3$ in an inert liquid hydrocrbon medium.

References Cited by the Examiner

UNITED STATES PATENTS

| | | | |
|---|---|---|---|
| 1,914,557 | 6/1933 | Craner | 252—431 |
| 2,388,178 | 10/1945 | Peterson | 260—94.9 |
| 2,396,920 | 3/1946 | Larson | 260—94.9 |
| 2,439,765 | 4/1948 | Walker | 252—431 |
| 2,440,498 | 4/1948 | Young et al. | 252—431 |
| 2,721,189 | 10/1955 | Anderson et al. | 252—431 |
| 2,822,357 | 2/1958 | Brebner | 252—431 |

FOREIGN PATENTS

| | | |
|---|---|---|
| 533,362 | 5/1955 | Belgium. |

OTHER REFERENCES

J. Organic Chem. vol. 10 (1954) pages 505–515.

SAMUEL H. BLECH, *Primary Examiner.*

TOBIAS E. LEVOW, *Examiner.*

UNITED STATES PATENT OFFICE
CERTIFICATE OF CORRECTION

Patent No. 3,218,266  November 16, 1965

David Blodgett Ludlum

It is hereby certified that error appears in the above numbered patent requiring correction and that the said Letters Patent should read as corrected below.

Column 2, line 7, for "mls" read -- mols --; column 4, line 43, for "0.20 mol" read -- 0.02 mol --; column 8, line 56, for "(1954)" read -- (1945) --.

Signed and sealed this 13th day of September 1966.

(SEAL)
Attest:

ERNEST W. SWIDER
Attesting Officer

EDWARD J. BRENNER
Commissioner of Patents